United States Patent
Zhao et al.

(10) Patent No.: US 10,801,997 B2
(45) Date of Patent: Oct. 13, 2020

(54) METHOD AND SYSTEM OF EVALUATING CEMENT BONDS THROUGH TUBING

(71) Applicant: GOWell International, LLC, Houston, TX (US)

(72) Inventors: Jiajun Zhao, Houston, TX (US); Jinsong Zhao, Houston, TX (US); Qinshan Yang, Katy, TX (US)

(73) Assignee: Gowell International, LLC, Houston, TX (US)

( * ) Notice: Subject to any disclaimer, the term of this patent is extended or adjusted under 35 U.S.C. 154(b) by 227 days.

(21) Appl. No.: 15/906,270

(22) Filed: Feb. 27, 2018

(65) Prior Publication Data

US 2019/0265199 A1  Aug. 29, 2019

(51) Int. Cl.
| | |
|---|---|
| *G01N 29/12* | (2006.01) |
| *G01N 29/22* | (2006.01) |
| *G01V 1/50* | (2006.01) |
| *E21B 47/005* | (2012.01) |
| *E21B 17/10* | (2006.01) |
| *E21B 33/14* | (2006.01) |
| *E21B 47/12* | (2012.01) |

(52) U.S. Cl.
CPC ........... *G01N 29/12* (2013.01); *E21B 47/005* (2020.05); *G01N 29/225* (2013.01); *G01V 1/50* (2013.01); *E21B 17/1021* (2013.01); *E21B 33/14* (2013.01); *E21B 47/12* (2013.01); *G01N 2291/0231* (2013.01)

(58) Field of Classification Search
CPC .. E21B 17/1021; E21B 33/14; E21B 47/0005; E21B 47/12; G01N 2291/0231; G01N 29/12; G01N 29/225; G01V 1/50
See application file for complete search history.

(56) References Cited

U.S. PATENT DOCUMENTS

| | | | | |
|---|---|---|---|---|
| 5,089,989 | A * | 2/1992 | Schmidt | G01V 1/52 367/35 |
| 5,874,676 | A | 2/1999 | Maki, Jr. | |
| 2006/0067162 | A1 | 3/2006 | Blankinship et al. | |
| 2006/0262643 | A1 | 11/2006 | Blankinship et al. | |
| 2009/0231954 | A1* | 9/2009 | Bolshakov | G01V 1/50 367/35 |
| 2012/0026831 | A1* | 2/2012 | Mickael | G01V 1/52 367/25 |

(Continued)

FOREIGN PATENT DOCUMENTS

CA    2517658 A1    3/2006

OTHER PUBLICATIONS

Extended European Search Report for Application No. 19159404.3 dated Jul. 16, 2019.

*Primary Examiner* — Francis C Gray (74) *Attorney, Agent, or Firm* — Tumey L.L.P.

(57) ABSTRACT

A method and system for inspecting cement downhole. The method may comprise inserting an inspection device inside a tubing. The inspection device may comprise a centralizing module as well as a transducer, an azimuthal receiver, and a telemetry module. The method may further comprise activating the transducer, wherein the transducer generates a low-frequency cylindrical acoustic wave with normal incidence, detecting the locations and strengths of resonances generated, and creating a graph with an information handling system for analysis.

9 Claims, 9 Drawing Sheets

(56) References Cited

U.S. PATENT DOCUMENTS

| | | | |
|---|---|---|---|
| 2012/0163123 A1* | 6/2012 | Moos | G01V 1/50 |
| | | | 367/31 |
| 2017/0204719 A1* | 7/2017 | Babakhani | E21B 33/14 |
| 2018/0003845 A1* | 1/2018 | Sakiyama | E21B 47/005 |
| 2018/0031722 A1* | 2/2018 | Shu | G01V 1/50 |
| 2019/0032470 A1* | 1/2019 | Harrigan | E21B 47/12 |

* cited by examiner

METHOD AND SYSTEM OF EVALUATING CEMENT BONDS THROUGH TUBING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Field of the Disclosure

This disclosure relates to a field for a downhole tool that may be capable of detecting in cement, bad interfaces between casing and cement, and/or bad interfaces between cement and a formation. Processing recorded Mie resonances may help identify properties within cement attached to casing.

Background of the Disclosure

Tubing may be used in many different applications and may transport many types of fluids. Tubes may be conventionally placed underground and/or positioned in an inaccessible area, making inspection of changes within tubing difficult. Additionally, tubing may be surrounded and/or encased by casing. It may be beneficial to evaluate the interface between the casing and the cement. Previous methods for inspecting cement have come in the form of non-destructive inspection tools that may transmit linear acoustic waves that may be reflected and recorded for analysis without the presence of tubing. Previous methods may not be able to perform measurements of the interface between casing and cement through tubing.

Currently, cement bonds can only be evaluated without the tubing downhole. This is because tubing is made of steel, and the steel tubing's resonance interferes with current evaluation techniques (e.g., pitch-catch method, sonic CBL, and pulse-echo method). Further, steel tubing strongly hampers the penetration of high-frequency acoustic waves. This means that the tubing must be removed from the borehole in order to evaluate the cement bonds. Removing and then replacing the tubing requires time, and thus money. It would be much more efficient and cost-effective to be able to evaluate cement bonds with the tubing remaining downhole.

To avoid the Lamb-wave resonances of the tubing, as well as the resonances of the casing, this invention uses low-frequency acoustic waves with normal incidence. The low frequency allows for better penetration, and the normal incidence allows for evaluation of the entire downhole system. One of the requirements of this new method is that the acoustic waves emitted must hit the object of evaluation perpendicularly.

BRIEF SUMMARY OF SOME OF THE PREFERRED EMBODIMENTS

These and other needs in the art may be addressed in embodiments by a device and method for evaluating cement bonds without the tubing downhole.

A method for inspecting cement downhole may comprise inserting an inspection device inside a tube. The inspection device may comprise a centralizing module as well as a transducer, an azimuthal receiver, and a telemetry module. The method may further comprise activating the transducer, wherein the transducer generates a low-frequency acoustic wave with normal incidence, detecting the locations and strengths of resonances generated, and creating a graph with an information handling system for analysis.

A method for inspecting cement downhole may comprise inserting an inspection device inside a tube. The inspection device may comprise a centralizing module as well as a transducer, a receiver, an azimuthal receiver, and a telemetry module. The method may further comprise activating the transducer, wherein the transducer generates a low-frequency acoustic wave with normal incidence, and recording resonant frequencies.

An inspection device may comprise a centralizing module as well as a transducer and azimuthal receiver. The inspection device may further comprise an information handling system and a memory module.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

The present disclosure relates to embodiments of a device and method for inspecting and detecting properties of cement attached to casing. More particularly, embodiments of a device and method are disclosed for inspecting cement walls surrounding casing with the tubing still downhole. In embodiments, an inspection device may generate low-frequency acoustic waves with normal incidence in surrounding tubing, casing, and cement. In embodiments, a transducer generates cylindrical acoustic Mie resonances. At Mie resonances, the resonance status (amplitude and resonant frequency) is sensitive to the ambient environment so that changes in a wellbore's condition, e.g., cement bond, may be reflected by a change in resonance status for detection.

Figure 1:
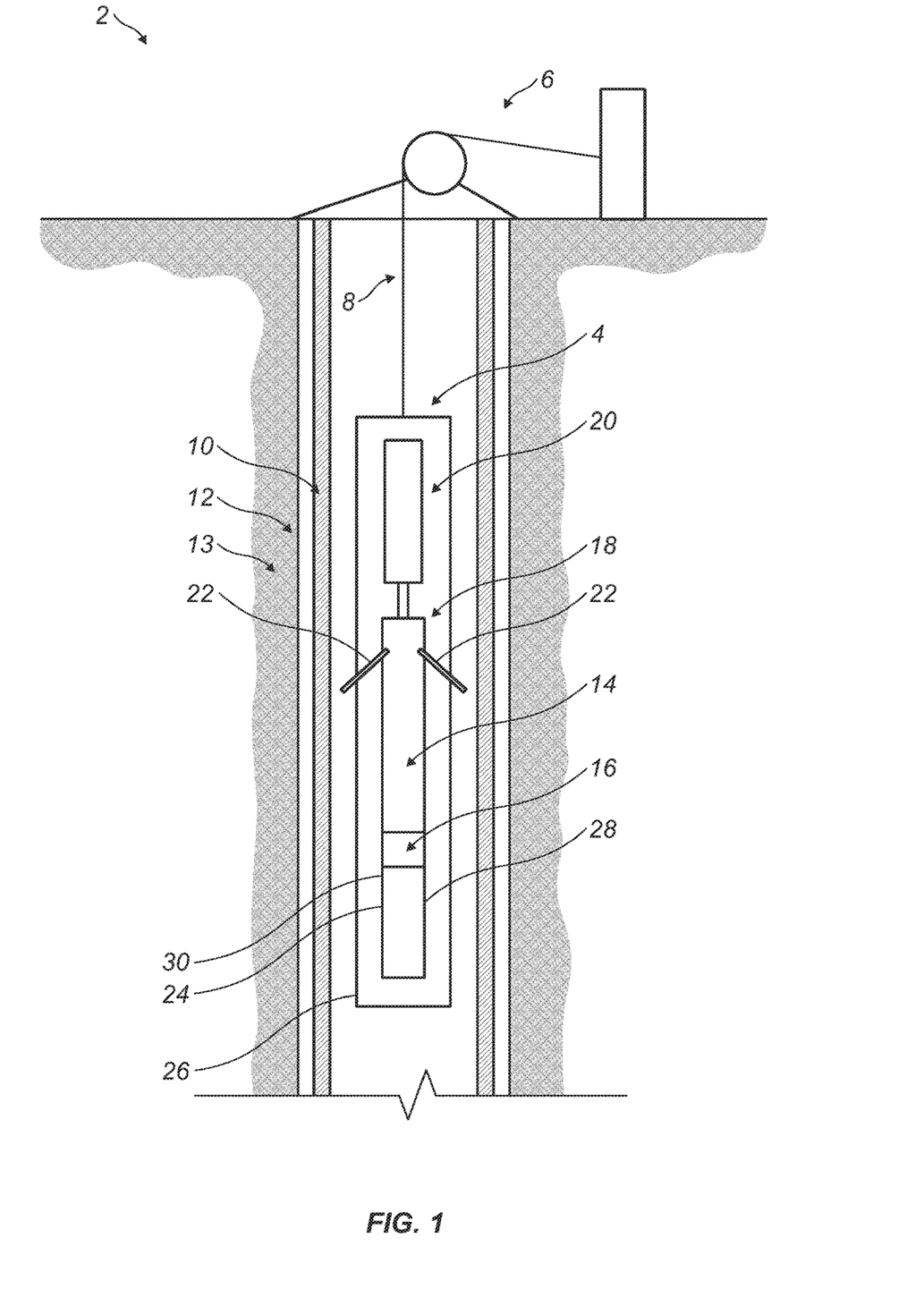
FIG. 1 illustrates an embodiment of an inspection system disposed downhole.

FIG. 1 illustrates an inspection system 2 comprising an inspection device 4 and a service device 6. In embodiments, inspection device 4 and service device 6 may be connected by a tether 8. Tether 8 may be any suitable cable that may support inspection device 4. A suitable cable may be steel wire, steel chain, braided wire, metal conduit, plastic conduit, ceramic conduit, and/or the like. A communication line, not illustrated, may be disposed within tether 8 and connect inspection device 4 with service device 6. Without limitation, inspection system 2 may allow operators on the surface to review recorded data in real time from inspection device 4.

In embodiments, inspection device 4 may be inserted into a tubing 10, wherein tubing 10 may be contained within a casing 12. In further embodiments, there may be a plurality of casing 12, wherein tubing 10 may be contained by several additional casings 12. Inspection device 4, as illustrated in FIG. 1, may be able to determine the location of aberrations within a cement 13, which may comprise inadequate casing 12 and cement 13 adhesion, inadequate cement 13 and formation (not illustrated) adhesion, cracks in cement 13, and/or the like.

FIG. 1 further illustrates inspection device 4 comprising a transducer 14, an azimuthal receiver 16, a centralizing module 18, and a telemetry module 20. In embodiments, as shown, transducer 14 may be disposed below centralizing module 18 and telemetry module 20, and above azimuthal receiver 16. In other embodiments, not illustrated, transducer 14 may be disposed above and/or between centralizing module 18 and telemetry module 20. Transducer 14 may also be disposed below azimuthal receiver 16.

Figure 2:
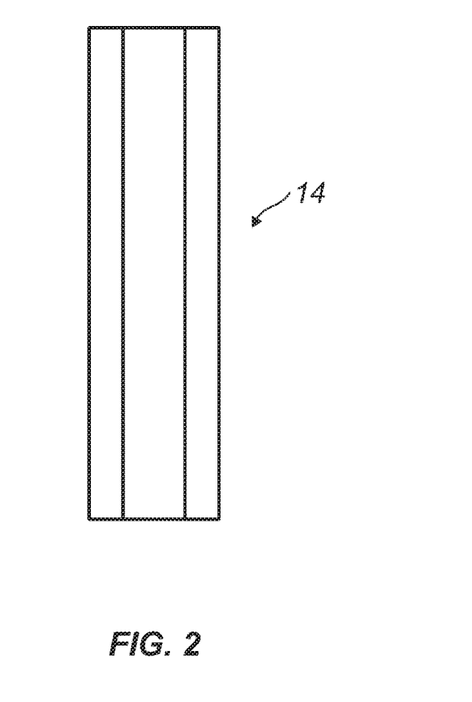
FIG. 2 illustrates an embodiment of a transducer with cylindrical shape.

In embodiments, transducer 14 may emit cylindrical acoustic waves. FIG. 2 illustrates a transducer 14 with a cylindrical shape. Further, in embodiments, transducer 14 may be equal to or longer than 20 mm. Without limitation, transducer 14 may comprise a transmitter compartment that is capable of generating cylindrical wave fronts. In embodiments, transducer 14 generates in-phase vibration at low frequencies with normal incidence. In embodiments, low frequencies may range from 1 kHz to 200 kHz. The use of low frequencies provides for better penetration by the acoustic waves. Normal incidence is the condition in which a wave-front is parallel to an interface, such that the ray path is perpendicular (normal) to the surface. The angle of incidence is zero. In embodiments, normal incidence allows for evaluation of the entire downhole system as inspection device 4 moves to different locations in the wellbore.

Figure 3:
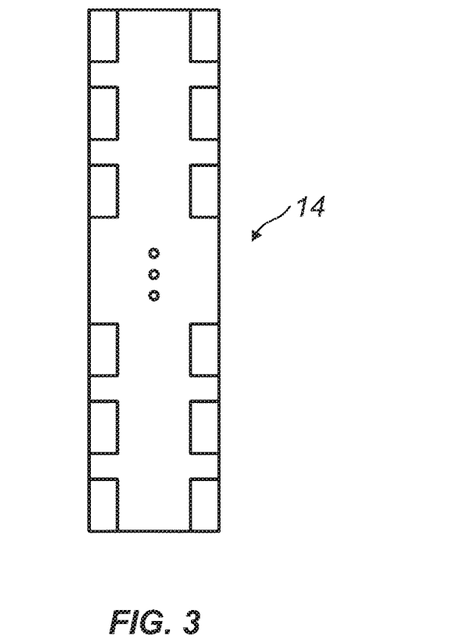
FIG. 3 illustrates an embodiment of a transducer with a monopole transducer array.

In embodiments, the purpose of the acoustic waves emitted by transducer 14 is to create resonances. Resonances occur when the vibration of one object at the natural frequency of another causes the latter to go into vibrating motion. Resonance is a phenomenon in which a vibrating system or external force drives another system to oscillate with greater amplitude at specific frequencies. In embodiments, transducer 14 generates cylindrical acoustic Mie resonances that characterize the resonances of the entire borehole system. Acoustic Mie resonance is the resonance wherein the scattering of acoustic waves results from the presence of large liquid and/or solid particles, whose maximum dimension is larger than the sound wavelength. At Mie resonances, the resonance status (amplitude and resonant frequency) is sensitive to the ambient environment so that changes in a wellbore's condition, e.g., cement bond, may be reflected by a change in resonance status for detection. Alternatively, as illustrated in FIG. 3, transducer 14 may comprise a monopole transducer array for in-phase vibration at low frequencies. In embodiments, transducer 14 that may comprise a monopole transducer array may have spacing of less than 150 mm between neighboring array elements.

In embodiments, the change of resonances and acoustic power are measured by determining the amount of electrical power provided to transducer 14, which is illustrated in FIG. 1. The amount of electrical power provided to transducer 14 is measured by probing the voltage and/or current on the power line, not illustrated, that feeds transducer 14. Fluctuations of the electrical power provided to transducer 14 detect both the locations of resonances as well as the strength of the resonances associated with the value of cement impedance behind casing 12.

Figure 4:
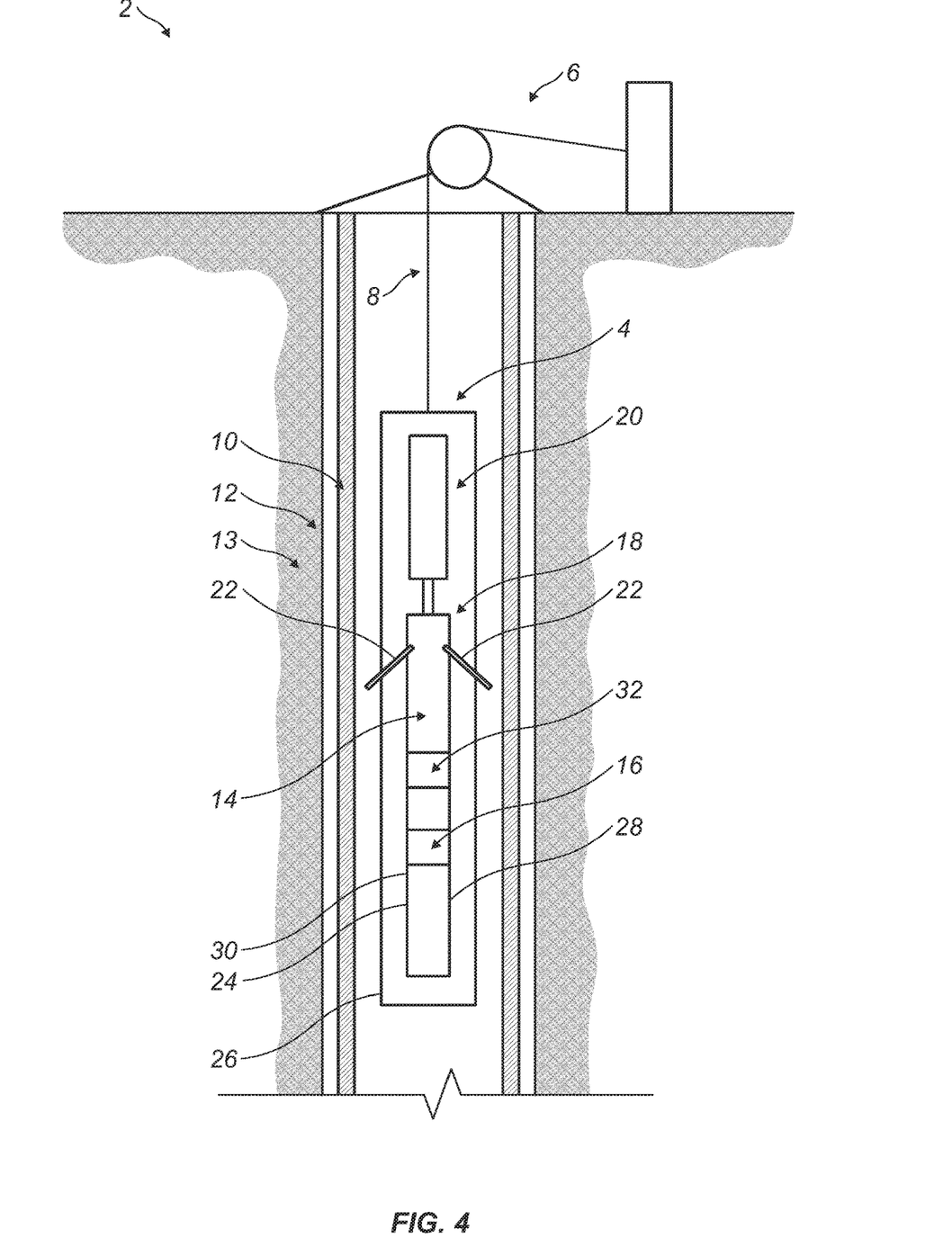
FIG. 4 illustrates an alternative embodiment of an inspection system disposed downhole.

Alternatively, in embodiments, inspection device 4 may also include a receiver 32 as illustrated in FIG. 4. In embodiments, receiver 32 operates essentially as a transmitter in reverse, i.e., pressure variations caused by acoustic energy produce electrical signals. In embodiments, receiver 32 measures resonant frequencies. As illustrated in FIG. 4, receiver 32 may be disposed at any location within inspection device 4. In other alternative embodiments, transducer 14 may be configured to emit cylindrical acoustic waves as well as receive acoustic signals.

As illustrated in FIG. 1, inspection device 4 may also include azimuthal receiver 16. In embodiments, azimuthal receiver 16 may assist in testing for eccentering of tubing 10 based, in part, on azimuthal phase profiles.

As also illustrated in FIG. 1, centralizing module 18 may be used to position inspection device 4 inside tubing 10. In embodiments, centralizing module 18 laterally positions inspection device 4 at about a center of tubing 10. Centralizing module 18 may be disposed at any location above and/or below transducer 14. In embodiments, centralizing module 18 may be disposed above transducer 14 and below telemetry module 20. Centralizing module 18 may comprise one or more arms 22. In embodiments, there may be a plurality of arms 22 that may be disposed at any location along the exterior of centralizing module 18. Specifically, arms 22 may be disposed on the exterior of centralizing module 18. In an embodiment, as shown, at least one arm 22 may be disposed on opposing lateral sides of centralizing module 18. Additionally, there may be at least three arms 22 disposed on the outside of centralizing module 18. Arms 22 may be moveable at about the connection with centralizing module 18, which may allow the body of arm 22 to be moved closer and/or farther away from centralizing module 18. Arms 22 may comprise any suitable material. Suitable material may be, but is not limited to, stainless steel, titanium, metal, plastic, rubber, neoprene, and/or any combination thereof. In other embodiments, not illustrated, inspection device 4 may employ a standoff instead of centralizing module 18.

Telemetry module 20, as illustrated in FIG. 1, may comprise any devices and processes for making, collecting, and/or transmitting measurements. For instance, telemetry module 20 may comprise an accelerator, gyro, and the like. In embodiments, telemetry module 20 may operate to indicate where inspection device 4 may be disposed within tubing 10. Telemetry module 20 may be disposed at any location above or below transducer 14. In embodiments, telemetry module 20 may send information through the communication line in tether 8 to a remote location such as a receiver or an operator in real time, which may allow an operator to know where inspection device 4 may be located within tubing 10. In embodiments, telemetry module 20 may be centered about laterally in tubing 10.

As illustrated in FIG. 1, a memory module 24 may be disposed within inspection device 4. In embodiments, memory module 24 may store all received, recorded and measured data and may transmit the data in real time through a communication line in tether 8 to a remote location such as an operator on the surface. Memory module 24 may comprise flash chips and/or RAM chips, which may be used to store data and/or buffer data communication. Additionally, memory module 24 may further comprise a transmitter, processing unit and/or a microcontroller. In embodiments, memory module 24 may be removed from inspection device 4 for further processing. Memory module 24 may be disposed within any suitable location of a housing 26 such as about the top, about the bottom, or about the center of housing 26. In embodiments, memory module 24 may be in communication with a controller 28 and azimuthal receiver 16 by any suitable means such as a communication line.

In embodiments, an information handling system 30, discussed in further detail below, may be disposed in inspection device 4 and communicate with memory module 24 through tether 8. Information handling system 30 may analyze recorded acoustic waves to determine properties of cement bonds, determine the number of casings, and test eccentering of tubing 10. In embodiments, information handling system 30 may be disposed within inspection device 4 and may transmit information through tether 8 to service device 6.

Without limitation, information handling system 30 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, information handling system 30 may be a personal computer, a network storage device, or any other suitable device and may vary in size, shape, performance, functionality, and price. Information handling system 30 may include random access memory (RAM), one or more processing resources such as a central processing unit (CPU) or hardware or software control logic, ROM, and/or other types of nonvolatile memory. Additional components of information handling system 30 may include one or more disk drives, one or more network ports for communication with external devices as well as various input and output (I/O) devices, such as a keyboard, a mouse, and a video display. Information handling system 30 may also include one or more buses operable to transmit communications between the various hardware components.

Controller 28, as illustrated in FIG. 1, may control transducer 14. Controller 28 may be pre-configured at the surface to take into account the downhole logging environment and specific logging cases, which may be defined as a static configuration. It may also be dynamically configured by what azimuthal receiver 16 and/or receiver 32 may record. Controller 28 may be disposed at any suitable location within housing 26. In embodiments, such disposition may be about the top, about the bottom, or about the center of housing 26.

As further illustrated in FIG. 1, inspection device 4 may comprise housing 26 in which telemetry module 20, centralizing module 18, transducer 14, and azimuthal receiver 16, and/or the like may be disposed. Housing 26 may be any suitable length in which to protect and house the components of inspection device 4. In embodiments, housing 26 may be made of any suitable material to resist corrosion and/or deterioration from a fluid. Suitable material may be, but is not limited to, titanium, stainless steel, plastic, and/or any combination thereof. Housing 26 may be any suitable length in which to properly house the components of inspection device 4. For example, a suitable length may be about one foot to about ten feet. Additionally, housing 26 may have any suitable width. For example, the width may include a diameter from about one inch to about four inches. Housing may protect telemetry module 20, centralizing module 18, transducer 14, and azimuthal receiver 16, and/or the like from the surrounding downhole environment within tubing 10.

Service device 6 may comprise a mobile platform (e.g., a truck) or stationary platform (e.g., a rig), which may be used to lower and raise inspection device 4. In embodiments, service device 6 may be attached to inspection device 4 by tether 8. Service device 6 may comprise any suitable equipment that may lower and/or raise inspection device 4 at a set or variable speed, which may be chosen by an operator. The movement of inspection device 4 may be monitored and recorded by telemetry module 20.

Figure 5:
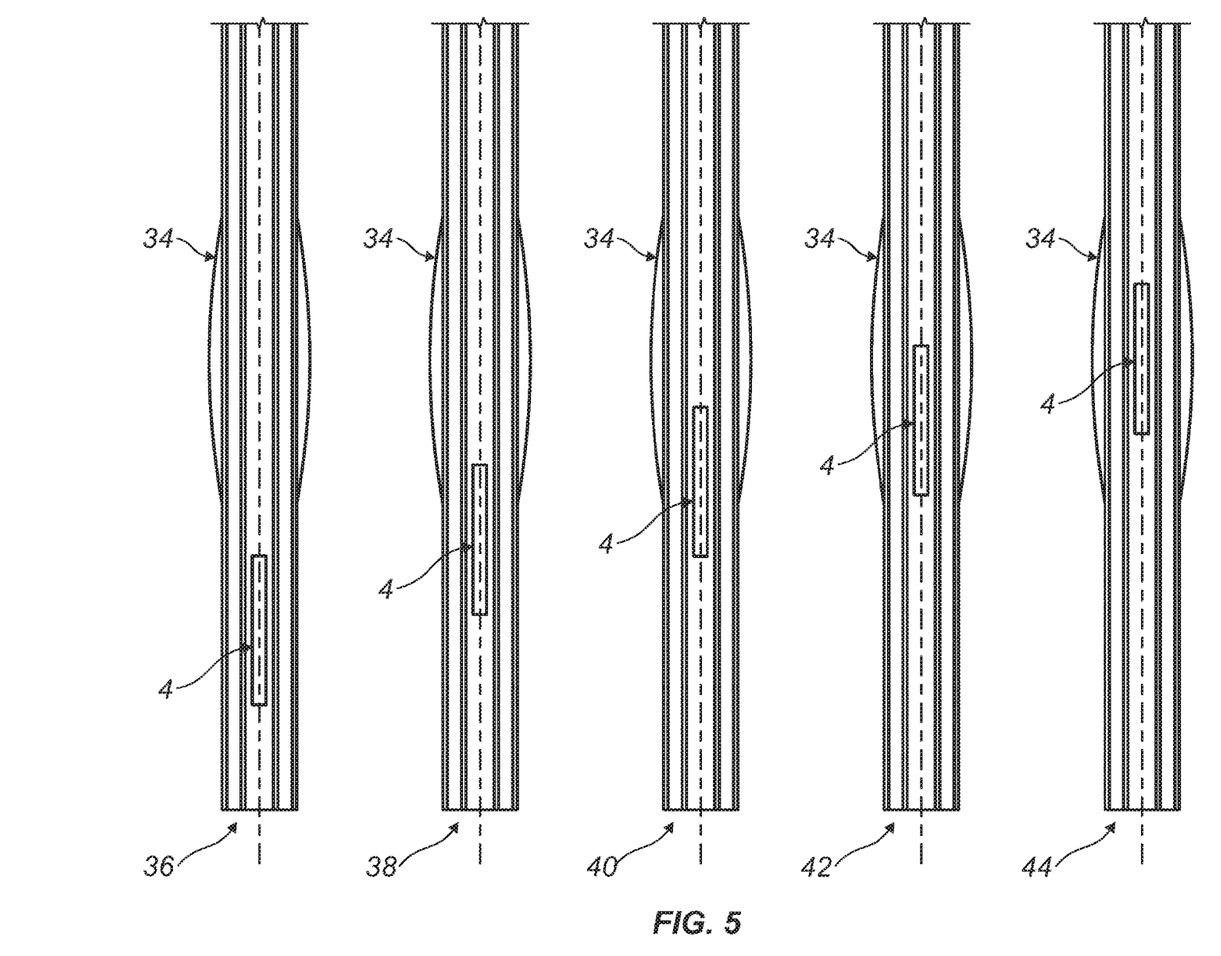
FIG. 5 illustrates an embodiment of an inspection device in five different positions.
Figure 6:
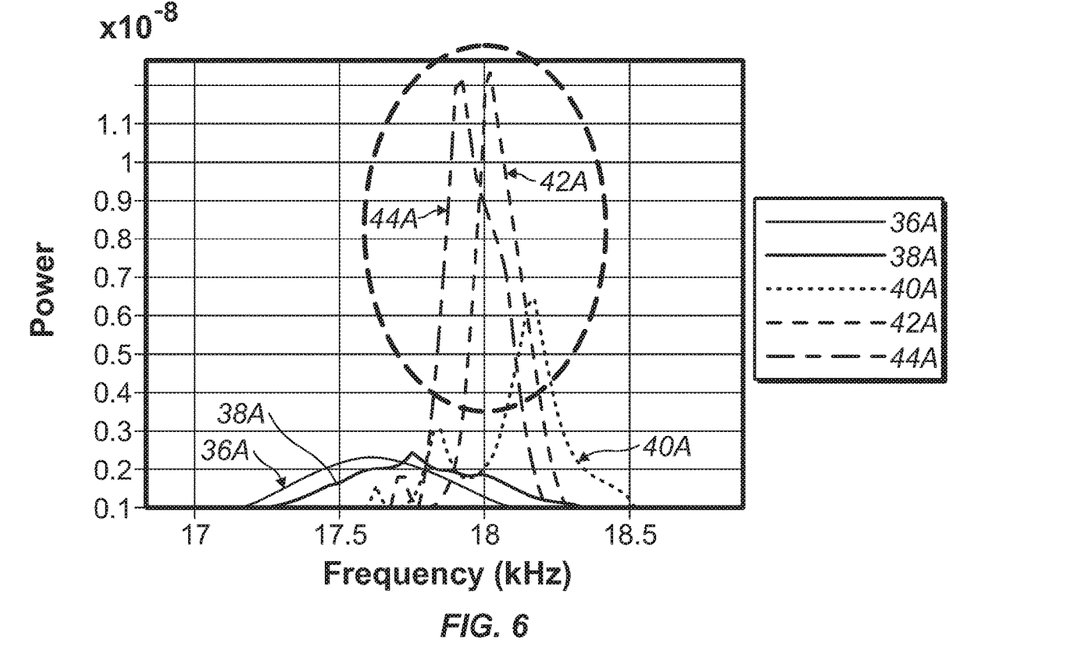
FIG. 6 illustrates a graph of acoustic power measurements of acoustic waves.

FIG. 5 generally illustrates inspection device 4 in five different positions in relation to a poor cement bond 34. FIG. 6 illustrates the acoustic power measurements of acoustic waves, which correspond to the five different positions illustrated in FIG. 5, at specific frequencies.

FIG. 5 illustrates, as an example, a 19 kHz-pulse emitted with a duration of 0.2 ms at the five different positions illustrated in FIG. 5. In embodiments, inspection device 4 as shown in a first wellbore 36 and a second wellbore 38 detect relatively low acoustic power as illustrated in FIG. 6 by acoustic waves 36A and 38A, respectively, given that inspection device 4 has not yet encountered poor cement bond 34 at those positions. In embodiments, this is due to transducer 14 emitting acoustic waves with normal incidence. In FIG. 5, inspection device 4 begins to encounter poor cement bond 34 in a third wellbore 40. The acoustic power of acoustic wave 40A, corresponding to the third position, is higher than the acoustic power of acoustic waves 36A and 38A as shown in FIG. 6. In embodiments, inspection device 4 in a fourth wellbore 42 and in a fifth wellbore 44 has encountered poor cement bond 34 as shown in FIG. 5, and the acoustic power of acoustic waves 42A and 44A, corresponding to these two positions, are higher than the acoustic power of acoustic waves 36A, 38A, and 40A.

Figure 7:
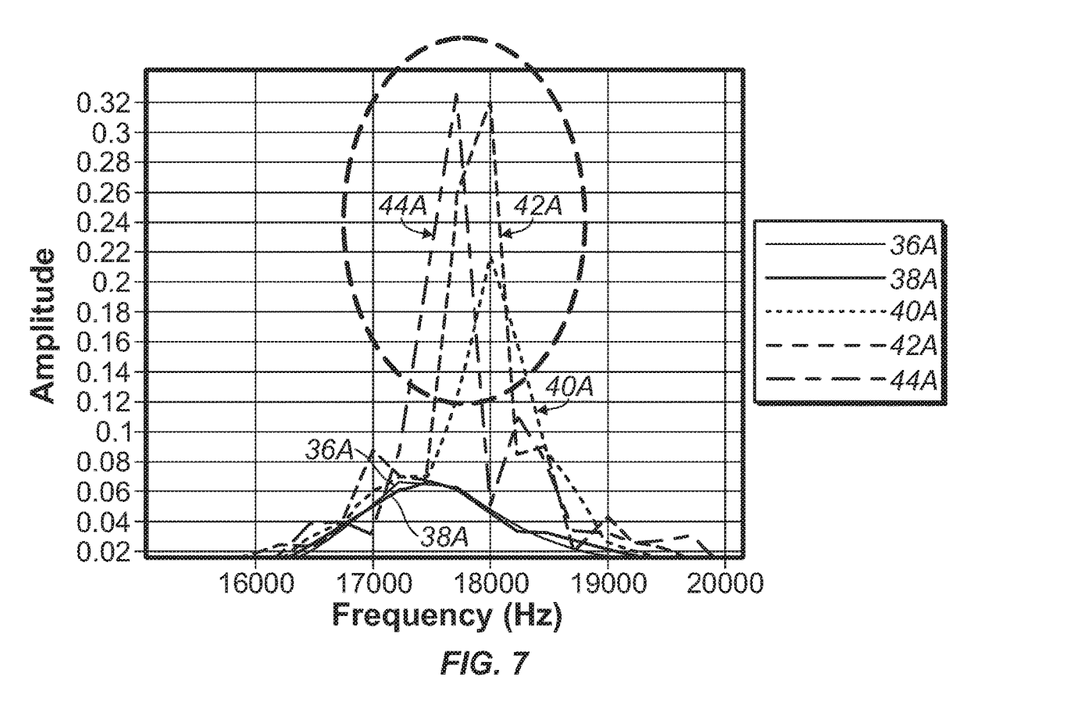
FIG. 7 illustrates a graph of amplitudes of acoustic waves.

Alternatively, FIG. 7 illustrates similar measures using receiver 32 to determine the amplitudes of acoustic waves, which correspond to the five different positions illustrated in FIG. 5, at specific frequencies. Receiver 32 measures the acoustic pressure signal. In embodiments, receiver 32 may be a simple monopole transducer on receiver mode. In embodiments, receiver 32 generates an electrical signal change in response to the acoustic pressure change. FIG. 7 illustrates, as an example, a 19 kHz-pulse emitted with a duration of 0.2 ms at the five different positions illustrated in FIG. 5. In embodiments, inspection device 4 as shown in a first wellbore 36 and a second wellbore 38 detect relatively low amplitudes as illustrated in FIG. 7 by acoustic waves 36A and 38A, respectively, given that inspection device 4 has not yet encountered poor cement bond 34 at those positions. In embodiments, this is due to transducer 14 emitting acoustic waves with normal incidence. In FIG. 5, inspection device 4 begins to encounter poor cement bond 34 in a third wellbore 40. The amplitude of acoustic wave 40A, corresponding to the third position, is higher than the amplitude of acoustic waves 36A and 38A as shown in FIG. 7. In embodiments, inspection device 4 in a fourth wellbore 42 and in a fifth wellbore 44 has encountered poor cement bond 34 as shown in FIG. 5, and the amplitudes of acoustic waves 42A and 44A, corresponding to these two positions, are higher than the amplitude power of acoustic waves 36A, 38A, and 40A.

Figure 8:
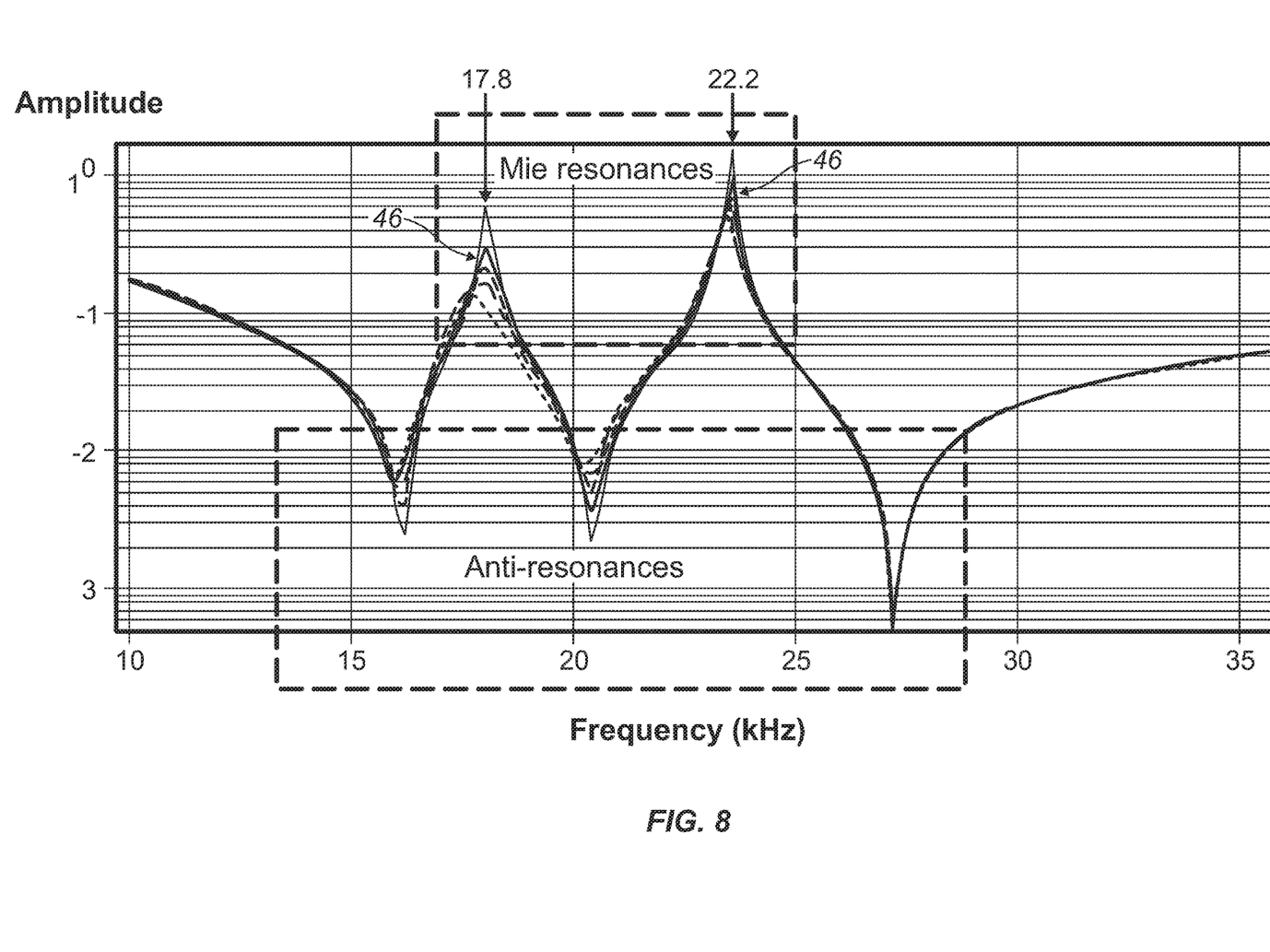
FIG. 8 illustrates a graph reflecting the impact of different cement impedances on acoustic wave amplitudes and peak locations.

FIG. 8 shows a graph reflecting the impact of different cement impedances on acoustic wave amplitudes and peak locations. Acoustic impedance is the product of density and seismic velocity, which varies among different cement bonds. The difference in acoustic impedance between casing 12 and layers of cement 13 affects the reflection coefficient (the ratio of amplitude of the reflected wave to the incident wave, or how much energy is reflected). FIG. 8 shows, as an example, 10 received signals 46 with Mie resonances as well as anti-resonances. As illustrated in FIG. 8, the peak locations for the acoustic waves shown occurred at 17.8 kHz and 22.2 kHz in this example. Cement impedance slightly affects these peak locations. However, cement impedance does significantly affect the amplitudes of the acoustic waves as shown.

Figure 9:
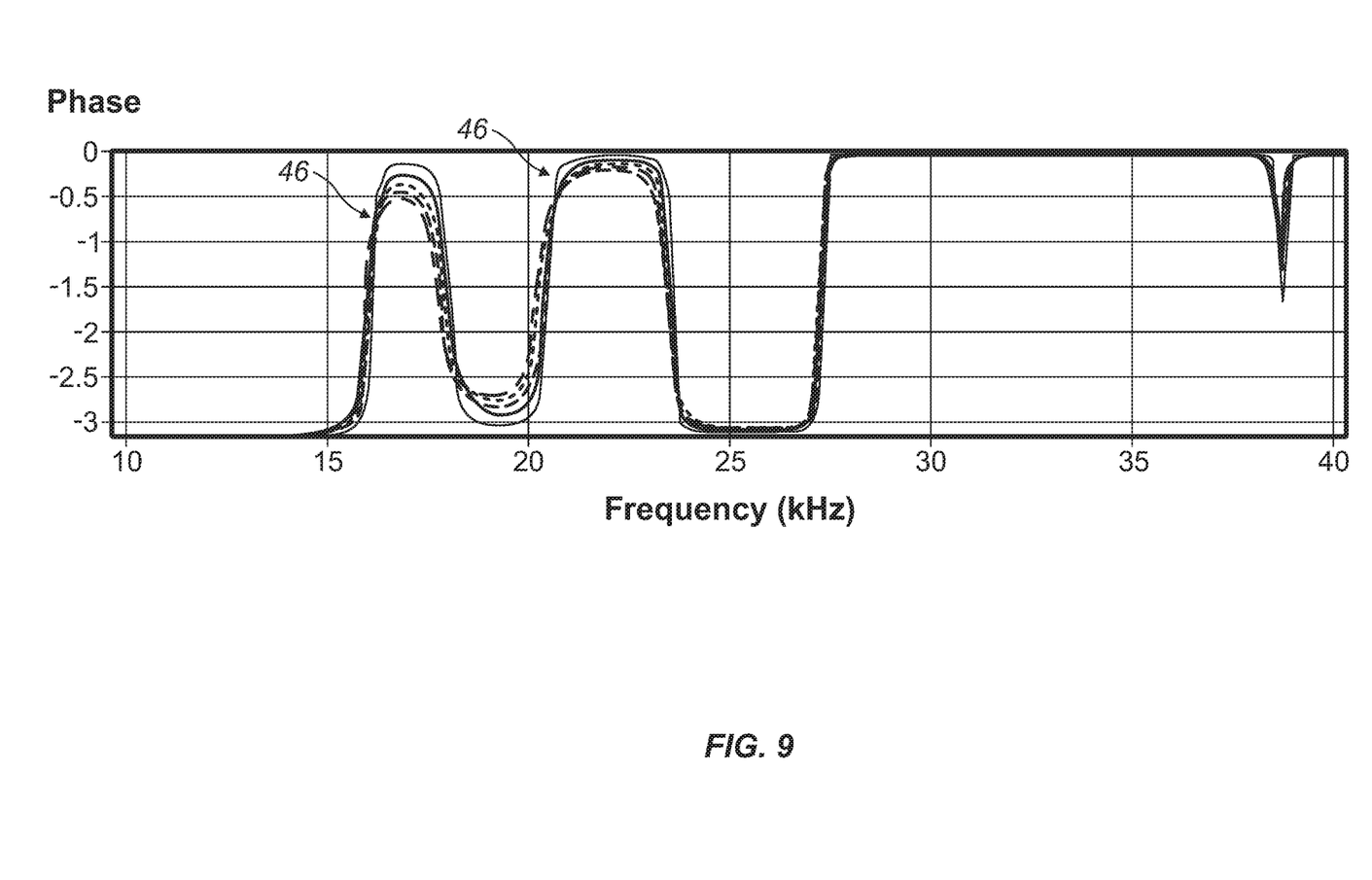
FIG. 9 illustrates a graph of the relationship between frequencies and phase.

FIG. 9 is a graph showing an example of the relationship between frequencies and phase. FIG. 9 shows, as an example, 10 received signals 46 with Mie resonances as well as anti-resonances. As illustrated in FIG. 9, Mie resonances are in phase between transducer 14 and its surroundings, while anti-resonances are out of phase. Further, FIG. 9 illustrates that Mie resonances result in a positive phase shift while anti-resonances result in a negative phase shift.

Figure 10:
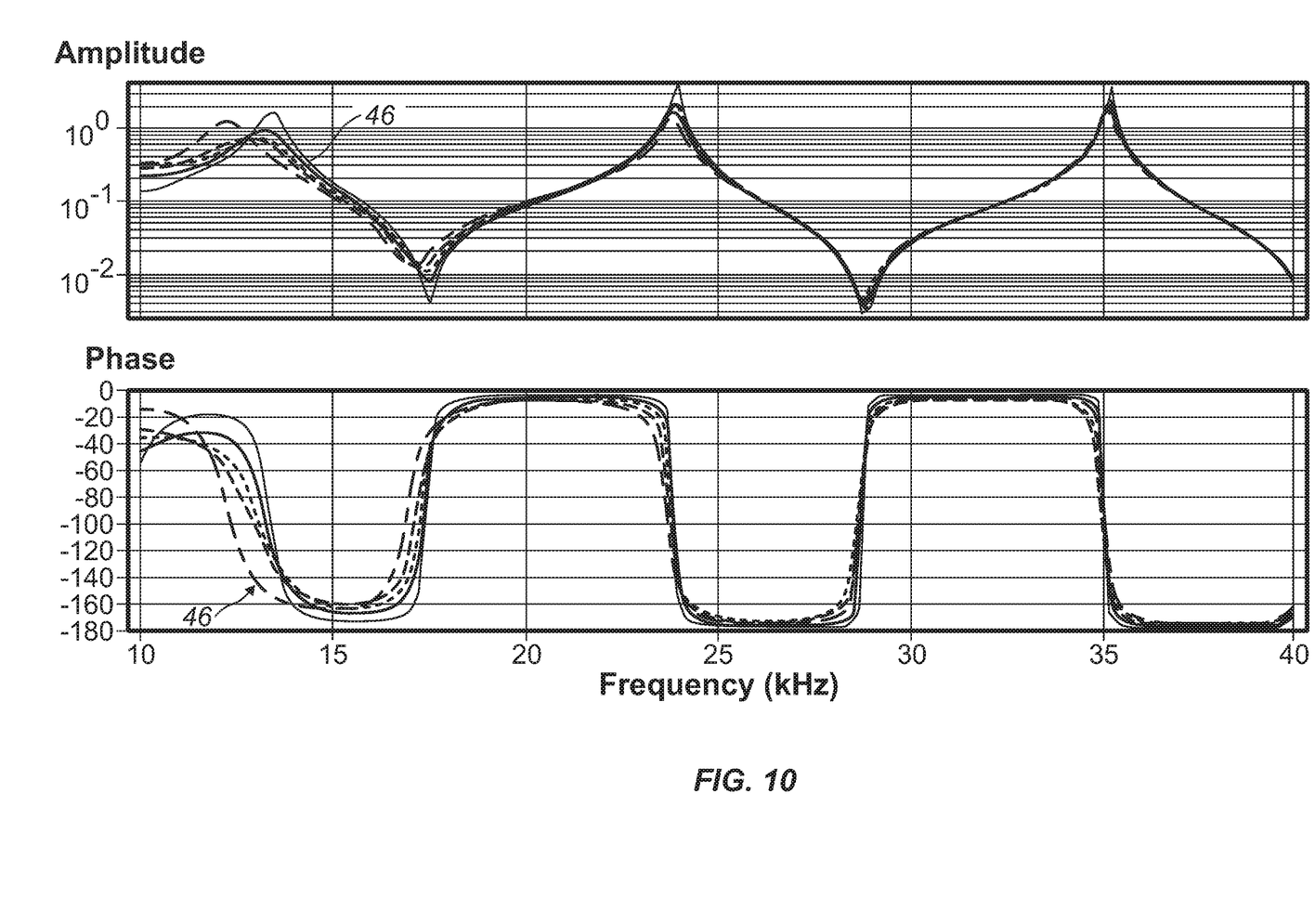
FIG. 10 illustrates a graph of amplitude and phase in relation to frequencies.

FIG. 10 is a graph showing that the number of casings 12 can be determined based on resonance profiles. FIG. 10 shows 10 waves 46, which represent received signals. The top half of the graph shows the relationship of frequency with amplitude of acoustic waves. The bottom half of the graph shows the relationship of frequency with phase. The number of casings 12 affect the peak locations for waves 46, which may be considered during analysis.

Figure 11:
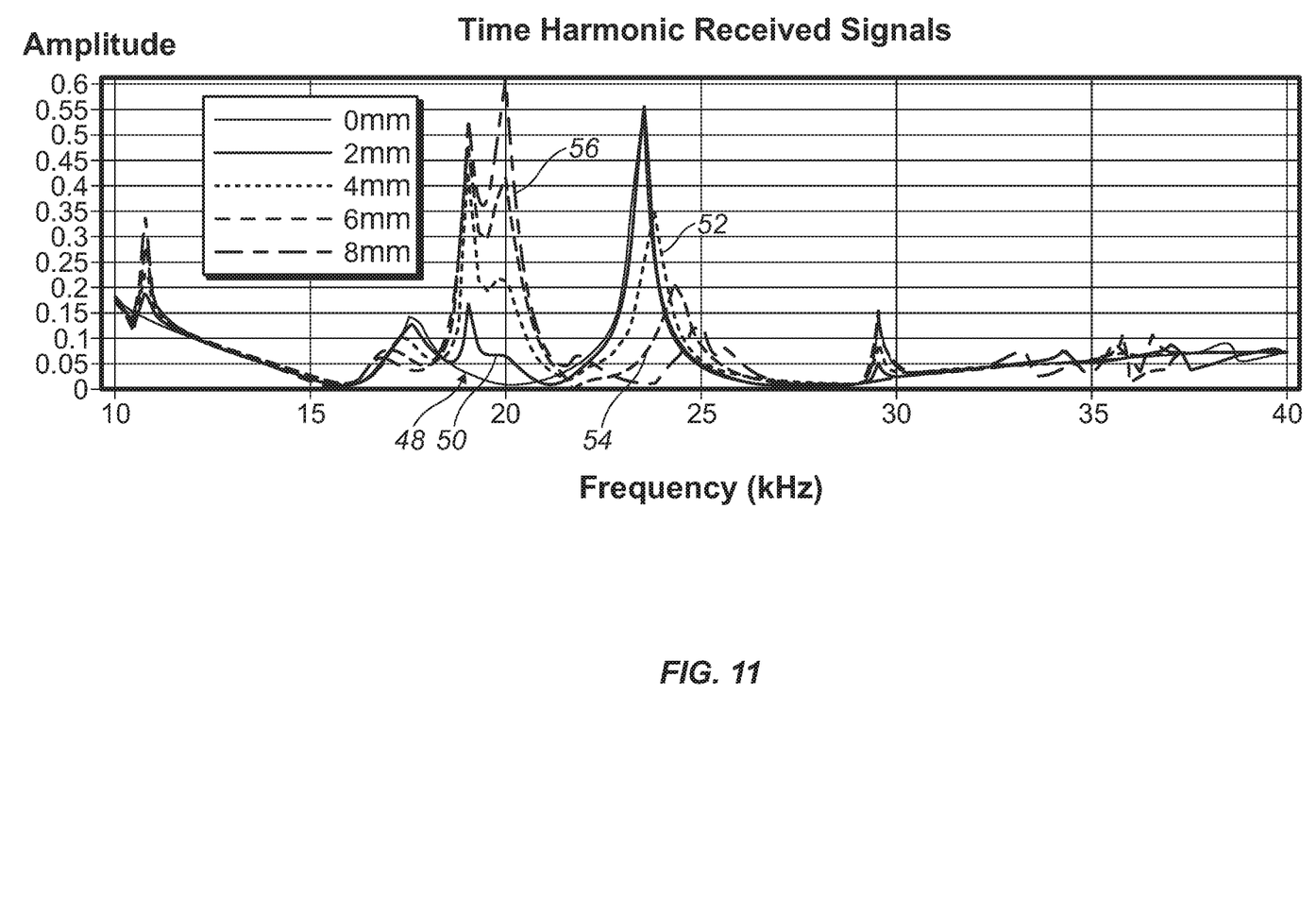
FIG. 11 illustrates a graph showing the effects of eccentering.

FIG. 11 is a graph showing the effects of eccentering. The graph in FIG. 11 shows the relationship between frequency and amplitude. Eccentering of inspection device 4 generates additional peaks in the amplitude of the acoustic waves because of multipole modes. Thus, the different waves in the graph are different signals. In this example, line 48 indicates no eccentering, line 50 indicates eccentering of 2 mm, line 52 indicates eccentering of 4 mm, line 54 indicates eccentering of 6 mm, and line 56 indicates eccentering of 8 mm. As shown in FIG. 11, line 48 (no eccentering) has fewer peaks than line 56 with eccentering of 8 mm. In embodiments, the effect of eccentering may be considered during analysis.

Certain examples of the present disclosure may be implemented at least in part with non-transitory computer-readable media. For the purposes of this disclosure, non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Although the present invention and its advantages have been described in detail, it should be understood that various changes, substitutions and alterations may be made herein without departing from the spirit and scope of the invention as defined by the appended claims.

What is claimed is:

1. A method for evaluating downhole cement bonds, comprising:
   inserting a transducer inside a tubing, wherein the tubing is concentrically surrounded by a casing and a wellbore, and further wherein the space between the casing and the wellbore contains cement;
   delivering the transducer to a depth of the tubing;
   activating the transducer, wherein the transducer is initially provided with an amount of electrical power in order for the transducer to generate vibrations, wherein the vibrations generate resonances at an incident angle of 90-degrees from the transducer, and further wherein the resonances generated maintain a stable vibration state;
   moving the transducer toward the surface of the wellbore;
   measuring and recording the amount of electrical power provided to the transducer as the transducer is moving toward the surface of the wellbore; and
   evaluating the amount of electrical power provided to the transducer as the transducer is moving toward the surface of the wellbore for fluctuations in the amount of energy provided to the transducer.

2. The method of claim 1, wherein the transducer has a cylindrical shape.

3. The method of claim 1, wherein the transducer comprises a monopole transducer array.

4. The method of claim 1, wherein the tubing is concentrically surrounded by two or more casings.

5. The method of claim 4, wherein spaces between the two or more casings contain cement.

6. The method of claim 5, wherein the spaces between the two or more casings contain liquids.

7. The method of claim 1, wherein the resonances generated are forced resonances.

8. The method of claim 7, wherein the forced resonances are Mie resonances.

9. The method of claim 1, wherein the vibrations are damped.

* * * * *